United States Patent
Hernández-Pérez (10) Patent No.: US 6,784,385 B2
(45) Date of Patent: Aug. 31, 2004

(54) ELECTRICAL TRANSFER SWITCH

(76) Inventor: Rubén Hernández-Pérez, P.O. Box 565, San Antonio, PR (US) 00690

( * ) Notice: Subject to any disclaimer, the term of this patent is extended or adjusted under 35 U.S.C. 154(b) by 0 days.

(21) Appl. No.: 10/136,832

(22) Filed: Apr. 29, 2002

(65) Prior Publication Data

US 2003/0201157 A1 Oct. 30, 2003

(51) Int. Cl.⁷ .................................................. H01H 9/26
(52) U.S. Cl. .................................................... 200/50.33
(58) Field of Search ............................ 200/50.33, 50.35

(56) References Cited

U.S. PATENT DOCUMENTS

| | | | | |
|---|---|---|---|---|
| 3,585,456 A | * | 6/1971 | Philips, Jr. .................. | 361/663 |
| 3,654,484 A | * | 4/1972 | Jorgenson et al. .......... | 307/149 |
| 3,691,288 A | * | 9/1972 | Sturdivan .................... | 174/52.1 |
| 3,705,280 A | * | 12/1972 | Harms ....................... | 200/50.33 |
| 5,790,369 A | * | 8/1998 | Sitler ........................ | 200/50.33 |
| 6,031,193 A | * | 2/2000 | Flegel ....................... | 200/50.33 |
| 6,107,701 A | * | 8/2000 | Flegel ....................... | 307/125 |
| 6,545,374 B1 | * | 4/2003 | Allenbach ................... | 307/125 |

* cited by examiner

*Primary Examiner*—Renee Luebke
(74) *Attorney, Agent, or Firm*—Patent Law Offices of Heath W. Hoglund (57) ABSTRACT

A transfer switch system includes a normal power supply and an emergency power supply. A set of linked switches select between these power supplies. A breaker seperates the power supplies from loading circuit. The switches and the breaker are mounted within an enclosure having an exterior handle. The exterior handle controls the selection between the normal and emergency power supplies.

17 Claims, 9 Drawing Sheets

ELECTRICAL TRANSFER SWITCH

FIELD OF THE INVENTION

The invention relates generally to a transfer switch, and more particularly to system for reverting to an alternative electric source during a power failure.

BACKGROUND OF THE INVENTION

The reliable supply of electricity is important for businesses and homes. Indeed, virtually every business and home relies upon the continuous supply of electricity to refrigerate food, to operate heating and cooling systems and many other appliances.

In some applications, the uninterrupted supply of electricity is absolutely critical. For example, computer systems generally require a virtually perfect power supply. Even a momentary glitch can disrupt their operation. Consequently, where the supply of electricity is unreliable, back-up power sources commonly referred to uninterrupted power supplies are used. These usually include a power detection and filtering circuit. If the main power fails, the back-up power source immediately detects the failure and switches to a battery or other back-up source. In more sophisticated systems, the back-up power source will switch to an alternative power supply such as a generator if the main power remains off line.

Although these types of systems are effective even for the most demanding of applications, they are also expensive. The circuitry required to monitor the main power supply and associated battery back up are relatively complex. Moreover, this type of uninterrupted power supply is not necessary for many applications. For example, many businesses or homes can tolerate a short interruption in their power supply. Interruptions of only a few minutes have little affect on heating or cooling systems. Critical applications such as a computer can depend upon a local back-up power supply. If the main power supply continues to fail, a local generator can be started to provide backup power.

The installation of a back-up generator requires that it is connected into the loading circuits in a manner that does not interfere with the normal delivery of power from a local utility company. The back-up generator must be disconnected when the local utility company provides power to prevent large flows of electricity between the two sources. In most conventional home or business settings, the internal wiring is connected directly to the local utility company through a power meter and breaker switches. The power meter is used to monitor usage for billing purposes. The breaker switches are used to prevent excessive flow of current through any loading circuit.

The addition of an auxiliary generator to a conventional home or business requires significant changes to the internal wiring, and typically requires the addition of an auxiliary cabinet. This cabinet houses switches and the additional wiring required to accommodate the generator.

For an existing structure, the installation of an additional cabinet and associated wiring requires significant modifications. The cabinet must be mounted and, depending upon the installation, generally cannot be mounted flush with the surface of the wall. In addition, external conduit generally is required to house the additional wiring. These external additions are cumbersome at best. Accordingly, an improved method of installing an auxiliary generator is desired.

SUMMARY OF THE INVENTION

According to one preferred aspect of the invention, a transfer switch system is especially suited for connecting loading circuits to a normal power source and to an emergency power source. The transfer switch system includes an enclosure, an electrical power meter, a normal power switch, an emergency power switch, and a handle. The enclosure has a front face and a plurality of side walls. The front face of the enclosure defines a circular hole sized to fit an electrical power meter. The side walls of the enclosure define holes for passing wires that carry electrical power from a normal power source and an emergency power source and at least one hole for passing wires that carry electrical power to loading circuits. The electrical power meter is mounted within the enclosure and extends through the circular hole in the front face. The electrical power meter is electrically connected with the normal power source to measure the electrical power flowing from the normal power source. The normal power switch is mounted within the enclosure and electrically connected to the normal power source and to the loading circuits. The normal power switch is configured to connect the normal power source to the loading circuits in an on position and to disconnect the normal power source from the loading circuits in an off position. The emergency power switch also is mounted within the enclosure proximate the normal power switch. The emergency power switch is electrically connected to the emergency power source and the loading circuits and configured to connect the emergency power source to the loading circuits in an on position and to disconnect the emergency power source from the loading circuits in an off position. The handle is mounted on the front face of the enclosure proximate the normal power switch and the emergency power switch. The handle includes a bracket extending into the interior of the enclosure to engage the normal power switch and the emergency power switch. Operation of the handle to a normal position places the normal power switch in the on position and the emergency power switch in the off position; operation of the handle to the emergency position places the normal power switch in the off position and the emergency power switch in the on position.

According to another aspect of the invention, a power meter and switch box are especially suitable for selecting between a utility power supply and an auxiliary power supply. The combination includes an enclosure, a meter, an auxiliary power terminal, a breaker switch, a set of power switches, and a handle. The enclosure has a first chamber and a second chamber. The meter is electrically connected with a utility power supply and configured to determine the amount of electrical power that has been used from the utility power supply. The meter is mounted within the first chamber of the enclosure. The meter includes a display that extends through a hole defined by the enclosure so that the amount of electrical power that has been used from the utility power supply can be readily determined. The auxiliary power terminal is configured to removeably connect with an auxiliary power supply. The auxiliary power terminal is mounted within the second chamber of the enclosure. The breaker switch is configured to removeably connect with a loading circuit. The breaker switch is mounted within the second chamber of the enclosure. The set of power switches is connected between the meter and the breaker switch and between the auxiliary power terminal and the breaker switch and are configured to operate in tandem. When the set of power switches forms an electrical connection between the meter and the breaker switch, the electrical power switches disconnect the auxiliary power terminal from the breaker switch. Likewise, when the set of power switches forms an electrical connection between the auxiliary power terminal and the breaker switch, the electrical power switches disconnect the meter from the breaker switch. The set of power switches are mounted in the second chamber. The handle engages the set of power switches and has a normal and an auxiliary position. Operation of the handle to the normal position causes the set of power switches to form an electrical connection between the meter and the breaker switch. Operation of the handle to the auxiliary position causes the set of power switches to form an electrical connection between the auxiliary power terminal and the breaker switch.

According to a further aspect of the invention, the handle includes a bracket that extends into the enclosure and engages the set of switches. The bracket includes a first and a second u-shaped plate and a flat plate. The first u-shaped plate defining a pair of slots. The flat plate extends through the pair of slots in the first u-shaped plate so that the flat plate is free to move along a first axis but is restricted from moving in any other direction by the confines of the pair of slots. Movement of the handle moves the flat plate along the first axis. The second u-shaped plate extends from the flat plate and is positioned so that the set of switches are confined between the walls of the u-shaped plate. Thus movement of the flat plate causes the u-shaped plate to operate the set of switches.

DETAILED DESCRIPTION OF THE INVENTION

Figure 1A:
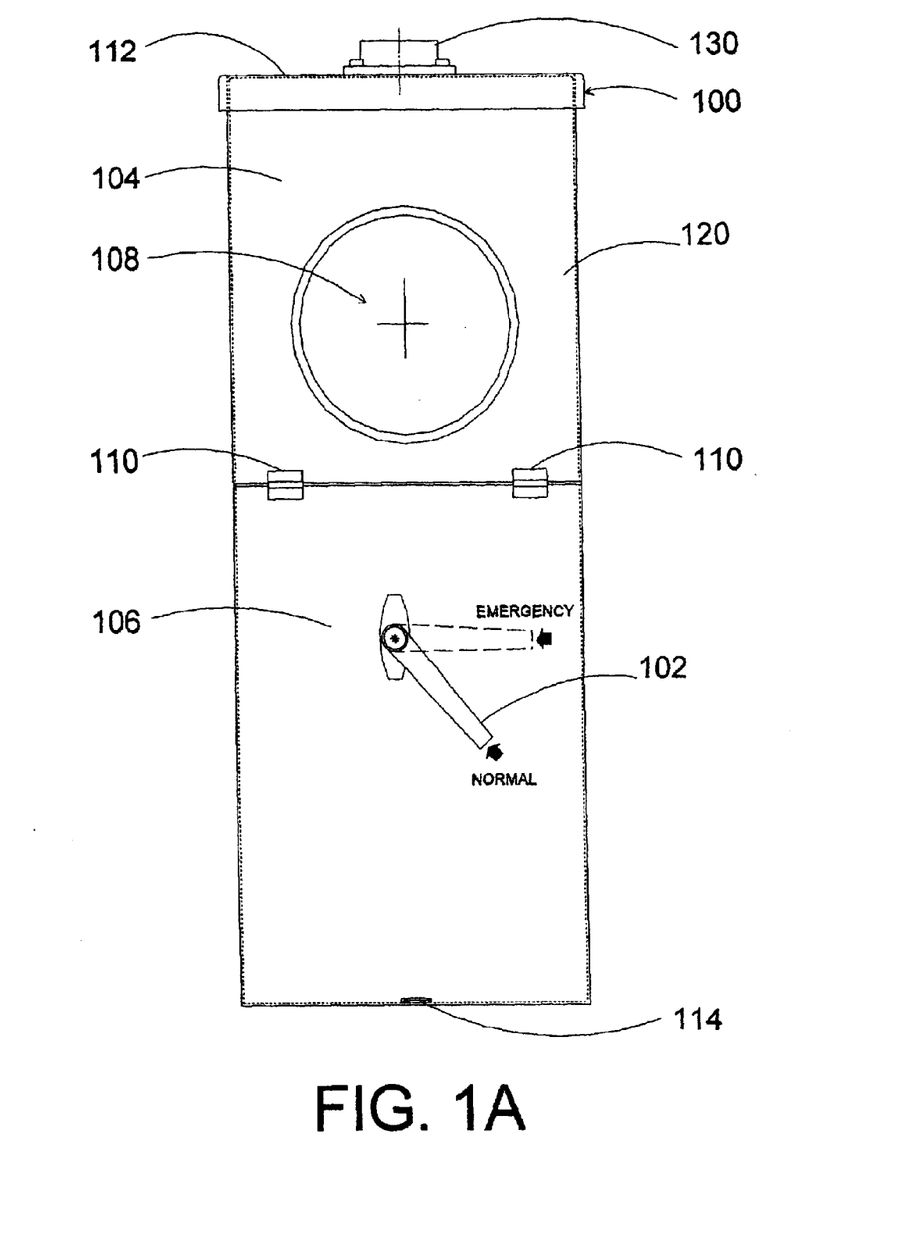
FIG. 1A is a front view of one preferred enclosure 100 including a power switch handle 102 having a normal and an emergency position.

Turning to FIG. 1A, the front cover 120 of enclosure 100 is divided into an upper panel 104 and a lower panel 106. The upper panel defines a circular hole 108 configured to fit around a standard electricity meter. Such meters are widely used and commercially available. Handle 102 is mounted on the lower panel 106. As further described below, it is positioned proximate breaker switches that are housed within enclosure 100. Handle 102 connects with such breaker switches through a bracket. Handle 102 has two positions: normal and emergency. Movement of the handle 102 from one position to the other, changes the position of the breaker switches. The operation of the breaker switches will be further described below.

The upper panel 104 and the lower panel 106 are both rectangular in shape. The bottom edge of upper panel 104 joins with the top edge of lower panel 106. The two panels are held together by a pair of hinges 110. The top of upper panel 104 fits beneath top cover 112. The bottom of lower panel 106 defines a slot that engages a tab 114 extending from enclosure 100. When the top of upper panel 104 is positioned beneath top cover 112, and the tab 114 extends through the slot in the lower panel 106, the front cover is held in place. Tab 114 defines a hole so that the front cover may be locked in place by securing a lock through the hole.

Figure 1B:
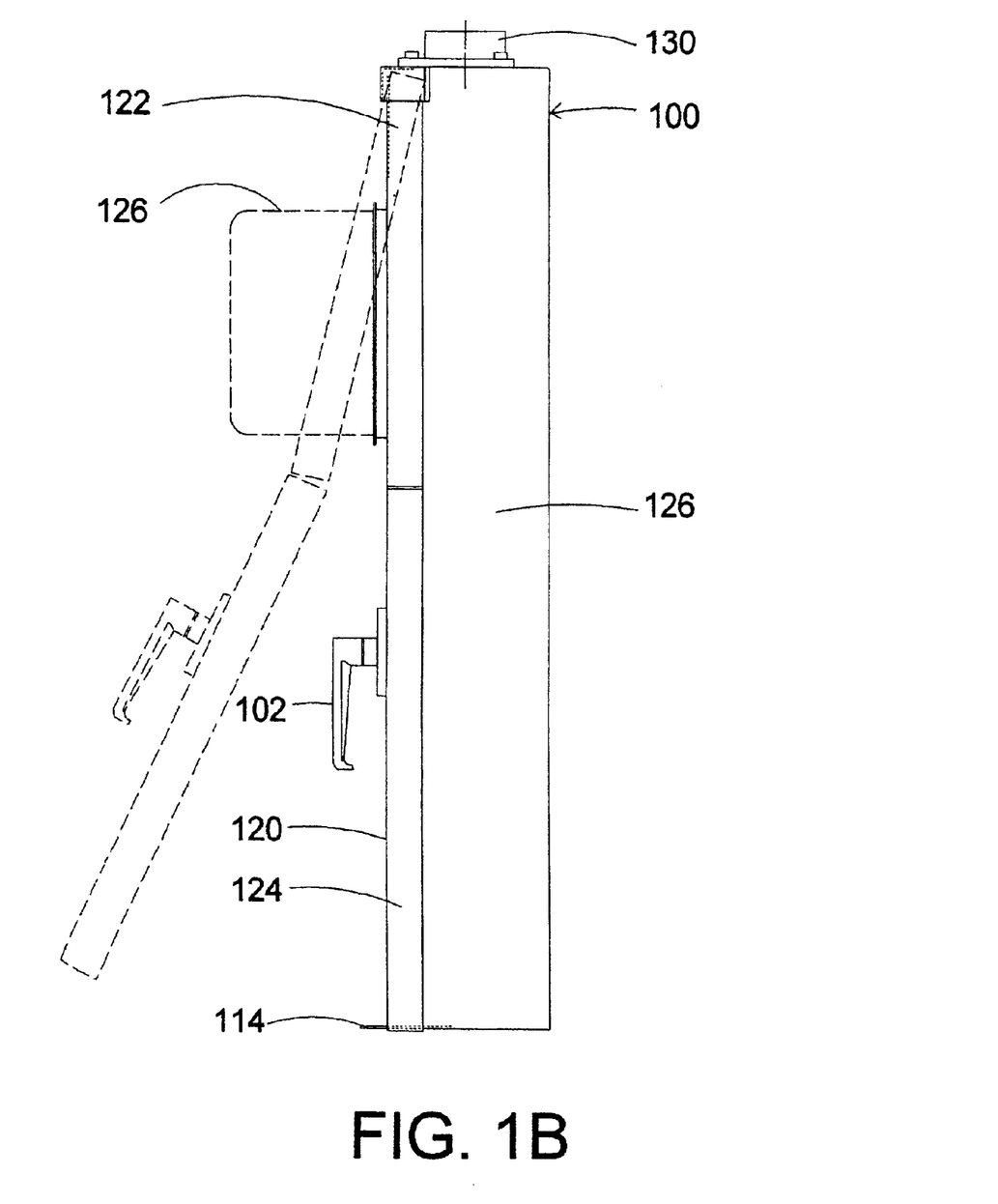
FIG. 1B is a side view of enclosure 100 including a face cover 120 shown in a closed position, and in an open position by phantom lines.

Turning to FIG. 1B, front cover includes wrap-around sides 122 that extend from upper panel 104, and wrap-around sides 124 that extend from lower panel 106. The wrap-around sides 122 and 124 overlap with side walls 126 of enclosure 100. Front cover is shown in place and in phantom lines as it is removed. Alternatively, the lower panel 106 may be lifted while the upper panel 104 remains substantially in place. This permits access to the breaker switches behind lower panel 106. A standard power meter 126 is also shown in phantom lines. It extends through hole 108 defined by enclosure 100.

Figure 1C:
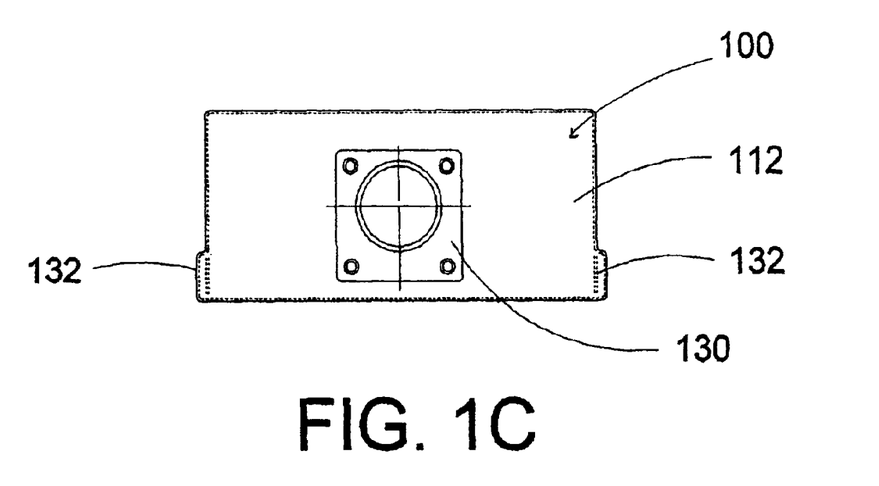
FIG. 1C is a top view of enclosure 100 including a conduit adapter 130.

Turning to FIG. 1C, the top cover 112 is shown. It substantially defines a rectangle with a slight extension 132 at its front corners to accept the wrap around sides 122 of the front cover. Conduit adapter 130 extends above top cover 112. It provides an interface for engaging a conduit housing the normal power supply wires. Enclosure 100 also includes a number of phantom holes positioned in the sides and back. Depending upon the placement of the enclosure, the auxiliary generator and the load circuits, the nearest phantom holes are removed to pass associated wires.

Figure 2:
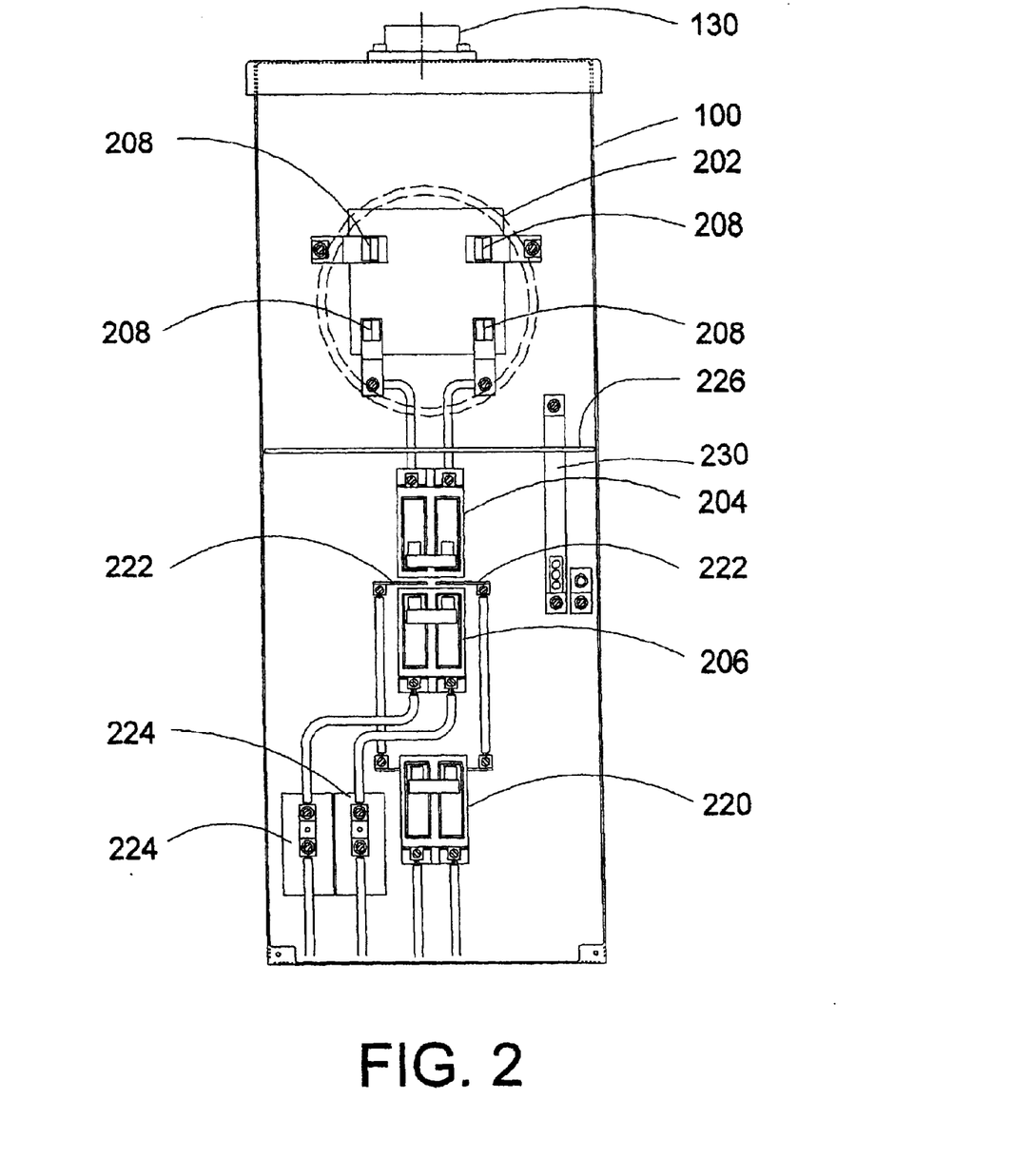
FIG. 2 is a front view of enclosure 100 shown with face cover 120 removed. Enclosure 100 houses meter socket 202, transfer breakers 204 and transfer breakers 206.

Turning to FIG. 2, one preferred transfer switch is shown. The transfer switch is housed within enclosure 100, which is shown without the front cover. Meter socket 202 is mounted in the upper portion of the enclosure 100. The meter socket 202 includes four sockets 208 for receiving the plugs from a standard meter. Electric power is received through the top sockets and passes through the meter to the lower sockets. The lower sockets are electrically connected to breaker switches 204. The meter socket 202 is positioned so that when a meter is plugged into the socket, the meter will align with the hole defined in the upper panel 104. The meter's face then faces outward so that it can be read easily.

Breaker switches 206 are configured to receive power through auxiliary terminals 224. These terminals are wired to an auxiliary generator. In the event of a power failure on the normal power supply, the auxiliary generator is activated. Breaker switches 206 are turned on and power flows from auxiliary terminals 224 through breaker switches 206.

Depending upon the application, the breaker switches 204 will have a pre-determined set level. When the current through the breaker switches 204 exceeds the pre-determined set level, then the breaker switches 204 automatically disconnect. This acts to break any circuit therethrough.

Likewise, the breaker switches 206 will also have a pre-determined set level, preferably the same as breaker switches 204. The sets of breaker switches 204 and 206 operate in tandem to select between the normal power supply which is provided through the meter circuit, and an emergency power supply. Either source is connected to a load through breaker switches 220.

More specifically, when power is provided from the normal power source, it flows through the meter circuit and through breaker switches 204. The breaker switches 204 are in a connected or on position. Consequently, power flows through the breaker switches to terminals 222. From terminals 222 it passes through wire connections to an on-off breaker 220. The on-off breaker connects with the loading circuits. It provides a single point for disconnecting the loading circuits from both the normal and auxiliary power supplies.

Terminals 222 are positioned between breaker switches 204 and breaker switches 206. Terminals 222 make electrical connections with both of the sets of breaker switches 204 and 206. Acting in tandem, the breaker switches 204 are in an on position, only when the breaker switches 206 are in an off position. Likewise, breaker switches 206 are in an on position, only when the breaker switches 204 are in an off position. The operation of these two sets of breaker switches 204 and 206 is coordinated by bracket 302 and link 402, described below with reference to FIGS. 3A, 3B and 4, respectively.

The interior of enclosure 100 is separated into two compartments by divider 226. The upper compartment houses the meter 126 and socket 202. The lower compartment houses breaker switches 204 and 206. Grounding bar 230 connects the two compartments.

Figure 3A:
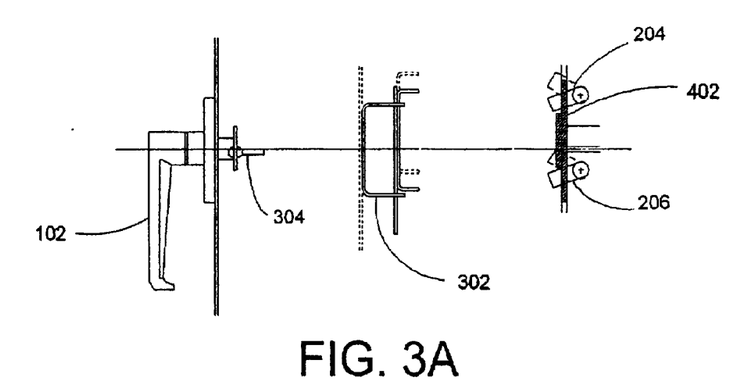
FIG. 3A is a partial, exploded, cross-sectional view of enclosure 100, transfer breakers 204 and transfer breakers 206. Handle 102 connects with transfer breakers 204 and transfer breakers 206 through bracket 302.
Figure 3B:
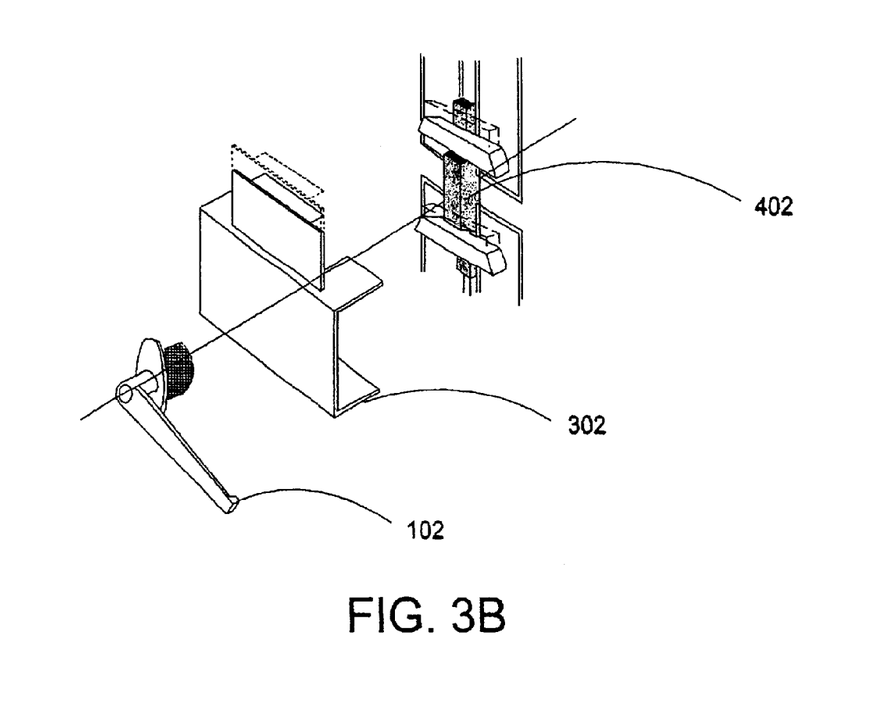
FIG. 3B is a partial, exploded, perspective view of handle 102, bracket 302 and transfer breakers 204 and 206.

Turning to FIGS. 3A and 3B, bracket 302 connects with handle 102. Handle 102 extends from the front face of the enclosure. The handle 102 has two positions: normal and emergency. Movement of the handle 102 between these positions moves pin 304 on the inside of the enclosure about an arc. Bracket 302 translates this arc movement into vertical movement. When the handle 102 is in the normal position, bracket 302 is in a lower position. This forces breaker switches 204 into an on position. When handle 102 is in the emergency position, bracket 302 is in an upper position (shown in phantom lines). This forces breaker switches 206 into an on position.

When breaker switches 204 are in the on position, then the normal power source is connected to the loading circuits. When breaker switches 206 are in the on position, then the emergency power source is connected to the loading circuits. To avoid connecting the normal power source to the emergency power source, one must be disconnected when the other is connected. In other words, when the normal power source is connected to the loading circuit, then the emergency power source must be disconnected, and vice versa.

Figure 4:
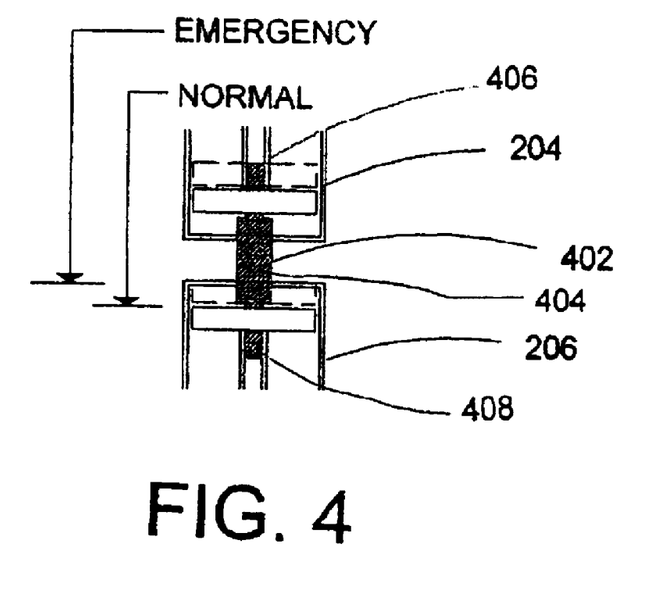
FIG. 4 is a front view of transfer breakers 204 and transfer breakers 206, including a link 402.

Turning to FIG. 4, link 402 forces breaker switch 206 into the off position when breaker switch 204 is moved to the on position. Likewise, link 402 forces breaker switch 204 into the off position when breaker switch 206 is moved to the on position.

Link 402 is formed of a body 404 that narrows at each end into blades 406 and 408. Breaker switches 204 are positioned adjacent one another so that they may be switched on and off together. Blade 406 extends between breaker switches 204. The shoulder formed between blade 406 and body 404 rests against the bottom surface of breaker switches 204. Movement of link 402 in an upward direction forces the shoulder of body 404 against the breaker switches 204 and switches them into an off position. Likewise, breaker switches 206 are positioned adjacent one another so that they may be switched on and off together. Blade 408 extends between breaker switches 206. The shoulder formed between body 404 and blade 408 rests against the top of surface of breaker switches 408. Movement of link 402 in a downward direction forces the other shoulder of body 404 against the breaker switches 206 and switches them into an off position.

Together, bracket 302 and link 402 permit an operator to switch from normal to emergency power. The bracket 302 and link 402 operate to move breaker switches 204 and 206 so that only one is in an on position at any time.

In addition, the breaker switches 204 and 206 are selected so that they disconnect before reaching the midpoint between their on and off positions. This ensures that the two circuits are not temporarily connected as the switches move from one state to the other.

Figure 5A:
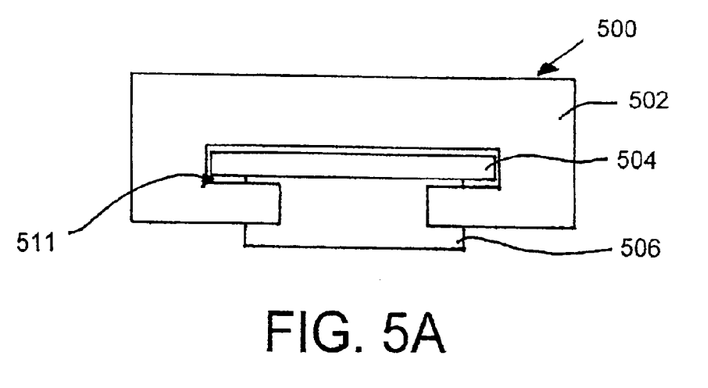
FIG. 5A is a top view of one preferred bracket 500 for connecting a handle to linked normal and emergency breaker switches.
Figure 5B:
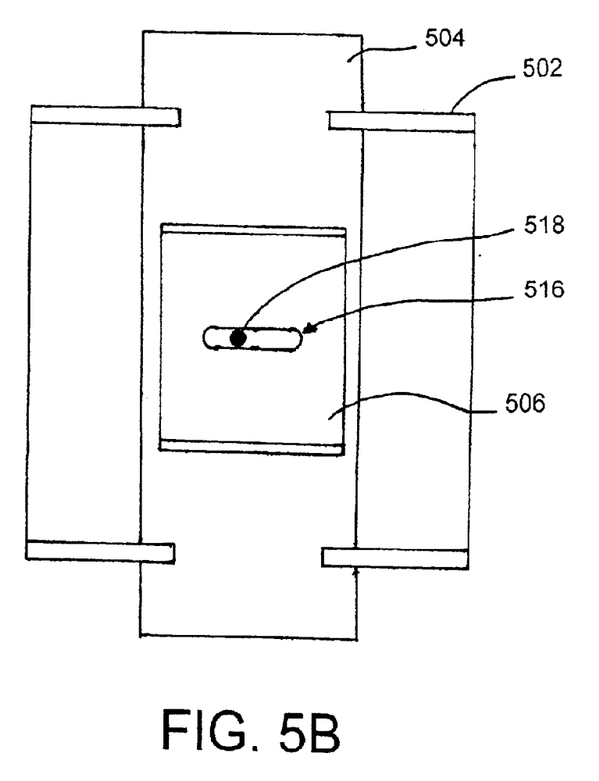
FIG. 5B is a front view of the bracket 500 shown in FIG. 5A.
Figure 5C:
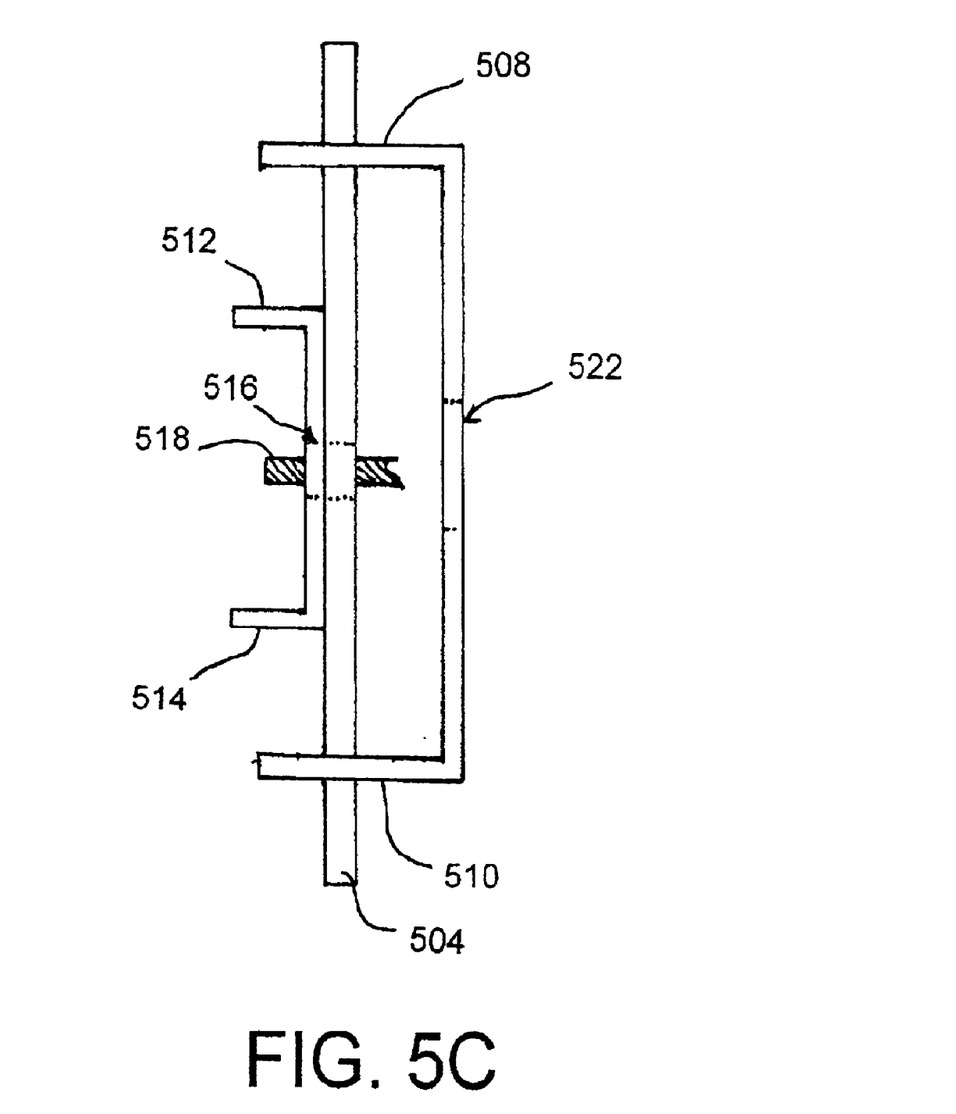
FIG. 5C is a side view of the bracket 500 shown in FIG. 5A.

Turning to FIGS. 5A, 5B, one preferred bracket 500 is shown in more detail. It essentially consists of three pieces: a base 502, a plate 504 and a switch bracket 506. The base 502 is formed of a single piece of bent sheet metal. It forms a U-shape. The upper side 508 and the lower side 510 each define a slot 511 through which plate 504 passes. The slots permit vertical movement of plate 504, only.

Switch bracket 506 attaches to plate 504. It is also formed into a U-shape. The upper side 512 meets breaker switch 204 (shown in FIG. 3) along an inner side. The lower side 514 meets breaker switch 206 (also shown in FIG. 3) also along an inner side. Switch bracket 506 also defines a horizontal slot 516 that extends through its middle. Slot 516 also extends through plate 504. Pin 518 of handle 102 extends through this slot.

In operation, movement of handle 102 between the normal and emergency positions moves pin 518 about an arc. Slot 516 translates that movement into vertical movement of switch bracket 506. This, in turn, operates breaker switches 204 and 206. More specifically, movement of switch bracket 506 in a downward direction forces switch 204 into an off position. As described above, this forces switch 206 into an on position. Similarly, movement of switch bracket 506 in an upward direction forces switch 206 into an off position. As also described above, this forces switch 204 into an on position.

Figure 6A:
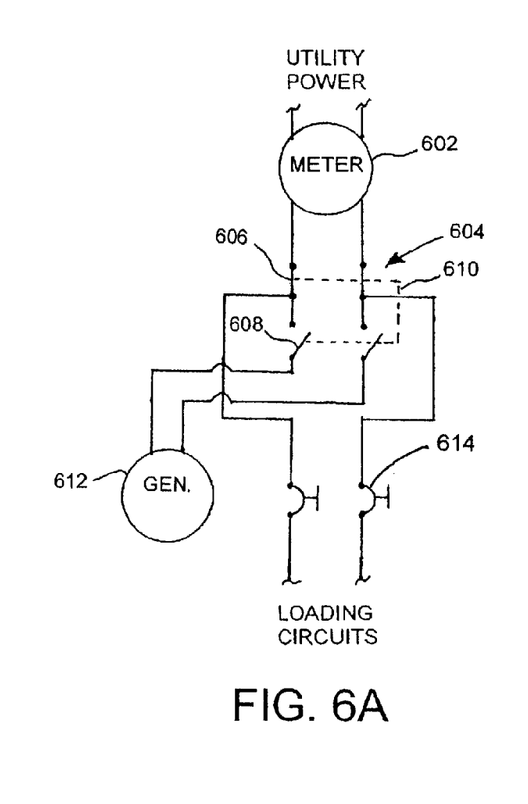
FIG. 6A is a circuit diagram showing connections amongst between meter 602, generator 612, and loading circuits through breaker circuit 604 (shown in the normal position).
Figure 6B:
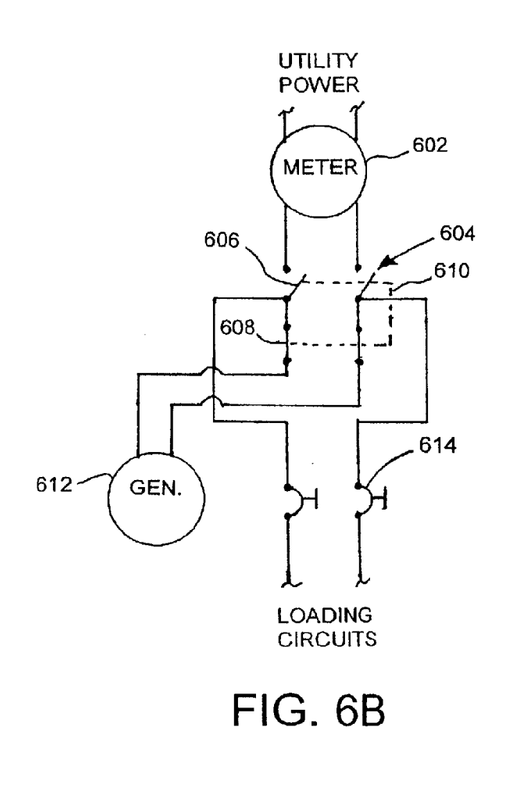
FIG. 6B is a circuit diagram showing connections amongst meter 602, generator 612, and loading circuits through breaker circuit 604 (shown in the emergency position).

Turning to FIGS. 6A and 6B, circuit diagrams of one preferred embodiment of the invention are described. Electrical power is delivered by a utility through meter 602, which tracks and displays total consumption on its face panel. In the normal position, shown in FIG. 6A, electrical power passes through meter 602 to breaker circuit 604 (shown in the normal position). Breaker circuit 604 consists of two sets of breaker switches 606 and 608, which are mechanically coupled through coupling 610. When in the on position, the first set of breaker switches 606 connects meter 602 to loading circuits. Under normal conditions, power is supplied by the power utility to the loading circuits through breakers 614.

When power fails, breaker circuit 604 is switched to the emergency position, shown in FIG. 6B. This places breaker switches 606 in an off position and breakes switches 608 in an on position. Generator 612 provides emergency electrical power. When in the on position, electricity flows through breaker switches 608 to the loading circuits through breakers 614.

Although the invention has been described with reference to specific embodiments, those skilled in the art will appre-

I claim:

1. A transfer switch system for connecting loading circuits to a normal power source and to an emergency power source comprising:

an enclosure having a front face and a plurality of side walls, wherein the front face defines a circular hole sized to fit an electrical power meter, and wherein the side walls define at least one hole for passing wires that carry electrical power from a normal power source and an emergency power source and at least one hole for passing wires that carry electrical power to loading circuits;

an electrical power meter mounted within the enclosure and extending through the circular hole in the front face and electrically connected with the normal power source to measure the electrical power flowing from the normal power source;

a normal power switch mounted within the enclosure and electrically connected to the normal power source and to the loading circuits and configured to connect the normal power source to the loading circuits in an on position and to disconnect the normal power source from the loading circuits in an off position;

an emergency power switch mounted within the enclosure proximate the normal power switch and electrically connected to the emergency power source and the loading circuits and configured to connect the emergency power source to the loading circuits in an on position and to disconnect the emergency power source from the loading circuits in an off position; and a handle mounted on the front face of the enclosure proximate the normal power switch and the emergency power switch, wherein the handle includes a bracket extending into the interior of the enclosure to engage the normal power switch and the emergency power switch so that operation of the handle to a normal position places the normal power switch in the on position and the emergency power switch in the off position, and so that operation of the handle to the emergency position places the normal power switch in the off position and the emergency power switch in the on position.

2. The transfer switch of claim 1, wherein the normal power switch comprises a pair of circuit breakers with one circuit breaker on a positive and one circuit breaker on a negative path of the normal power source and configured to automatically disconnect when the current therethrough exceeds a predetermined level, and wherein the emergency power switch comprises a pair of circuit breakers with one circuit breaker on a positive and one circuit breaker on a negative path of the emergency power source and configured to automatically disconnect when the current therethrough exceeds a predetermined level.

3. The transfer switch of claim 2, further comprising an emergency power terminal mounted within the enclosure and having a positive terminal electrically connected with the positive path and a negative terminal electrically connected with the negative path of the emergency power source, wherein the emergency power source is removeably connected with the emergency power terminal.

4. The transfer switch of claim 3, further comprising a meter socket configured to receive the electric power meter, wherein the meter socket is electrically connected between the normal power source and the normal power switch.

5. The transfer switch of claim 4, further comprising a pair of load breaker switches electrically connected with the loading circuits and configured to control the flow of electrical current so that when the breaker switches are in an off position the loading circuits are disconnected from the normal power source and the emergency power source, and when the breaker switches are in an on position the loading circuits are connected to one of the normal power source or the emergency power source depending upon the position of the normal power switch and the emergency power switch, and wherein the load breaker switches each include a terminal removeably connected with the loading circuits.

6. The transfer switch of claim 1, wherein the interior of the enclosure is divided into an upper chamber that houses the electrical power meter and a lower chamber that houses the normal power switch and the emergency power switch, wherein the at least one hole for passing wires that carry electrical power from a normal power source enter the upper chamber and the at least one hole for passing wires that carry electrical power to loading circuits enters the lower chamber, and wherein the front face of the enclosure is substantially rectangular in shape and is divided into an upper portion that covers the upper chamber and a lower portion hingedly attached to the upper portion that covers the lower chamber, wherein the upper portion defines the circular hole for the electrical power meter and the lower portion mounts the handle.

7. The transfer switch of claim 1, wherein the bracket of the handle includes:

an emergency push plate that engages the emergency power switch so that movement of the handle from the normal position to the emergency position causes the emergency push plate to move the emergency power switch from the off position to the on position; and a normal push plate that engages the normal power switch so that movement of the handle from the emergency position to the normal position causes the normal push plate to move the normal power switch from the off position to the on position.

8. The transfer switch of claim 7, wherein the emergency power switch and the normal power switch further comprise a linking arm positioned therebetween so that movement of the emergency power switch from the off position to the on position simultaneously moves the normal power switch from the on position to the off position, and so that movement of the normal power switch from the off position to the on position simultaneously moves the emergency power switch from the on position to the off position.

9. The transfer switch of claim 8, wherein the normal power switch comprises a pair of circuit breakers with one circuit breaker on a positive and one circuit breaker on a negative path of the normal power source and configured to automatically disconnect when the current therethrough exceeds a predetermined level, and wherein the emergency power switch comprises a pair of circuit breakers with one circuit breaker on a positive and one circuit breaker on a negative path of the emergency power source and configured to automatically disconnect when the current therethrough exceeds a predetermined level.

10. A power meter and switch box for selecting between a utility power supply and an auxiliary power supply comprising:

an enclosure having a first chamber and a second chamber and a front cover having a first portion that covers the first chamber and a second portion hingedly attached to the first portion that covers the second chamber and seals the first and second chambers from atmospheric conditions;

a meter electrically connected with a utility power supply and configured to determine the amount of electrical power that has been used from the utility power supply, wherein the meter is mounted within the first chamber of the enclosure and wherein the meter includes a display that extends through a hole defined by the enclosure so that the amount of electrical power that has been used from the utility power supply can be readily determined;

an auxiliary power terminal configured to removeably connect with an auxiliary power supply and mounted within the second chamber of the enclosure;

a breaker switch configured to removeably connect with a loading circuit and mounted within the second chamber of the enclosure;

a set of power switches connected between the meter and the breaker switch and between the auxiliary power terminal and the breaker switch and configured to operate in tandem so that when the set of power switches forms an electrical connection between the meter and the breaker switch, the electrical power switches disconnect the auxiliary power terminal from the breaker switch, and so that when the set of power switches forms an electrical connection between the auxiliary power terminal and the breaker switch, the electrical power switches disconnect the meter from the breaker switch, and wherein the set of power switches are mounted in the second chamber; and a handle engaging the set of power switches and having a normal and an auxiliary position, so that operation of the handle to the normal position causes the set of power switches to form an electrical connection between the meter and the breaker switch and so that operation of the handle to the auxiliary position causes the set of power switches to form an electrical connection between the auxiliary power terminal and the breaker switch.

11. The power meter of claim 10, wherein the enclosure further defines a first hole that enters the first chamber and passes wires that connect with the meter, and wherein the enclosure further defines a second and a third hole that enter the second chamber and pass wires that connect with the auxiliary power terminal and the breaker switch.

12. The power meter of claim 10, wherein the auxiliary power terminal comprises a screw terminal for a positive and negative wire connecting with an auxiliary power supply.

13. The power meter of claim 10, wherein the breaker switch has an on and an off position and a predetermined set level that automatically disconnects the loading circuit when the current therethrough exceeds the predetermined set level.

14. The power meter of claim 10, wherein the set of power switches comprises a pair of meter breaker switches connected between the meter and the breaker switch, and a pair of auxiliary breaker switches connected between the auxiliary terminal and the breaker switch.

15. The power meter of claim 14, further comprising a linking arm between the pair of meter breaker switches and the pair of auxiliary breaker switches, wherein movement of the meter breaker switches to an on position forces the auxiliary breaker switches to an off position and movement of the auxiliary breaker switches to an on position forces the meter breakers switches to an off position by operation of the linking arm.

16. The power meter of claim 10, wherein the handle is mounted proximate the second chamber and positioned with an outward orientation for access by an operator, and wherein the handle further comprises a bracket that extends into the second chamber to engage the set of switches so that operation of the handle causes the bracket to move the set of switches.

17. A transfer switch for connecting an auxiliary power source during a failure of a power utility comprising:

an enclosure defining a plurality of channels for receiving electrical connections;

a standard power meter electrically connected with a power utility to measure the amount of electrical power passing from the power utility to a load and to display a current reading, and positioned at least partially within the enclosure;

an auxiliary terminal electrically connected with an auxiliary power supply and positioned within the enclosure;

a breaker switch electrically connected with a load, positioned within the enclosure and configured to disconnect the load when the current thereto exceeds a predetermined threshold;

a set of switches electrically connected between the power meter, the electrical terminal and the breaker switch, wherein the electrical switches have a normal position and an emergency position so that the breaker switch is electrically connected to only the power meter in the normal position and to only the electrical terminal in the emergency position; and a handle mounted on an outside surface of the enclosure and extending into the enclosure to engage the set of switches wherein the handle comprises a bracket that extends into the enclosure and engages the set of switches, wherein the bracket includes:

a first u-shaped plate defining a pair of slots;

a flat plate extending through the pair of slots in the first u-shaped plate so that the flat plate is free to move along a first axis but is restricted from moving in any other direction by the confines of the pair of slots, and wherein movement of the handle moves the flat plate along the first axis; and a second u-shaped plate extending from the flat plate and positioned so that the set of switches are confined between the walls of the u-shaped plate, so that movement of the flat plate causes the u-shaped plate to operate the set of switches so that operation of the handle moves the set of switches between the normal position and the emergency position.

* * * * *